UNITED STATES PATENT OFFICE.

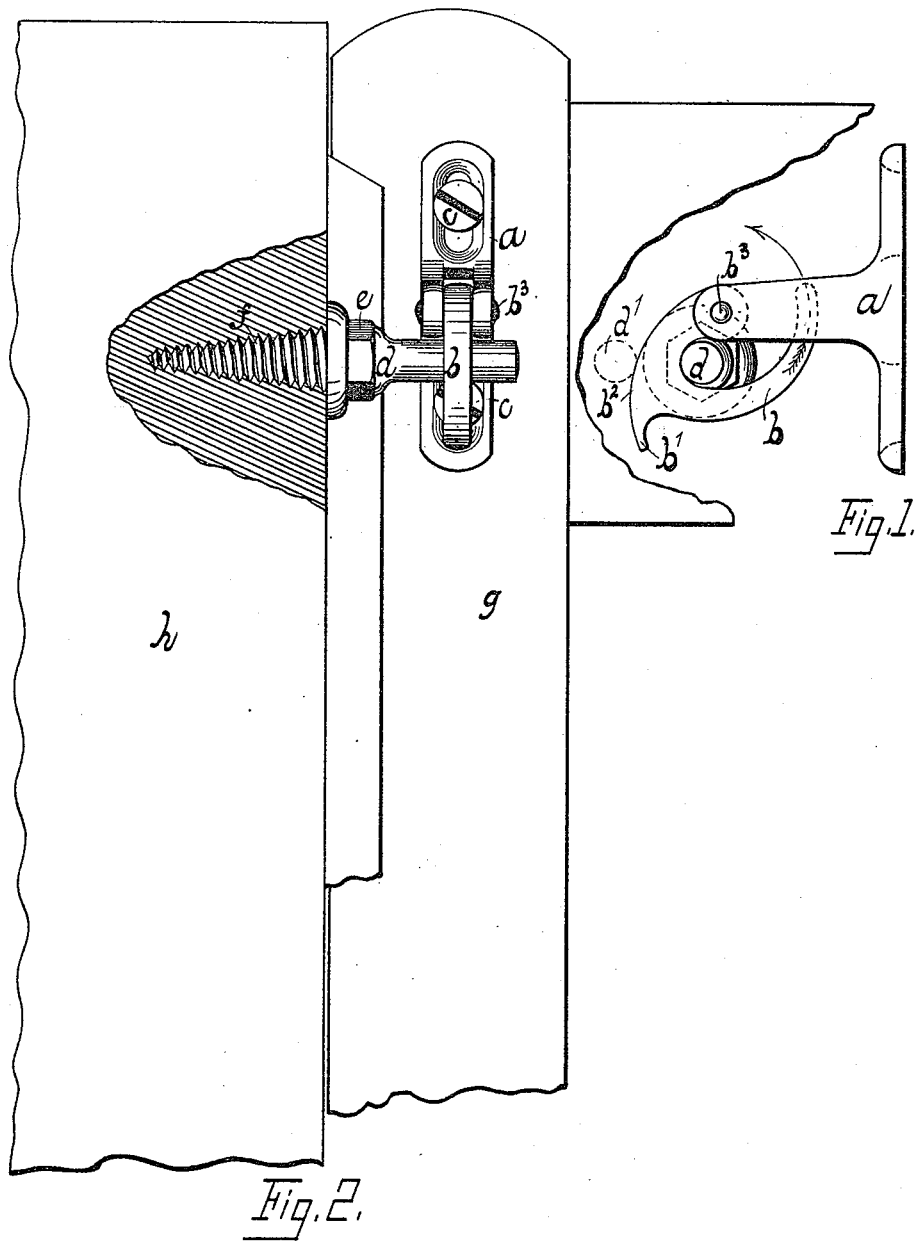

AVERY VAN WIE, OF INDIANAPOLIS, INDIANA, ASSIGNOR OF ONE-HALF TO BENJAMIN B. BOOTH, OF SAME PLACE.

GATE-LATCH.

SPECIFICATION forming part of Letters Patent No. 440,092, dated November 4, 1890.

Application filed February 23, 1889. Serial No. 300,991. (No model.)

*To all whom it may concern:*

Be it known that I, AVERY VAN WIE, of Indianapolis, county of Marion, and State of Indiana, have invented certain new and useful Improvements in Gate-Latches; and I do hereby declare the following to be a full, clear, and exact description of the invention, such as will enable others skilled in the art to which it appertains to make and use the same.

My improvement relates to that class of latches in which the hook or bolt is adapted to be held in proper position by gravity.

The objects are to produce a gate-latch that shall be efficient, durable, and cheap; and with these ends in view my invention consists in certain parts and form in construction, as will be more fully shown, described, and pointed out in the following drawings, specifications, and claim.

In the drawings forming part of this specification, Figure 1 is a side view of the latch in engagement with its keeper. Fig. 2 is a front view of the latch and keeper as attached to gate and post.

$a$ in the construction of the gate-latch is a bracket, which is secured firmly to the gate $g$ by means of screws $c$, which pass through elongated slots, which latter allow of its vertical adjustment. $a$ is also provided with two parallel projections, to and between the extremities of which is loosely pivoted the rotary gravity hook or latch $b$ at $b^3$.

$d$ is the pin or stop, over which the rotating hook catches. This pin is provided at $f$ with a tapering screw-section, and has formed at $e$ an angular section, adapting it to be turned by a wrench, so that it may be screwed very tightly into the gate-post $h$, which is broken away in the drawings to show said screw-section. $b$ has formed at $b'$ a finger-hold, by which this rotating hook is turned from its engagement with the stop $d$ when it is desired to open the gate. $b$ is also provided with a convex surface at $b^2$, which is adapted to strike against the pin obliquely at a point $d'$, as here shown, by which means the rotating hook $b$ is more gradually started to revolve when closed. The impulse thus received by this hook causes it to make a complete revolution upon its axis $b^3$ in the direction of the arrow, so that when the movement is complete the hook engages with the pin, as seen at $d$, Fig. 1. This rotating hook is retained in very nearly the position seen at Fig. 1 when unlatched. Hence for the hook to become unlatched accidentally from the effect of recoil due to the gate being closed too rapidly is a matter of impossibility, as the latch would have to return one-third of a revolution or more against the effect of gravity to become unlatched.

In the application of this latch the pin might be placed on the gate and the rotating hook on the post without changing the principle of action.

Having thus fully described my invention, what I claim as new, and desire to secure by Letters Patent, is—

In a gate-latch, the combination comprised of a pin or stop having a pointed screw-threaded section and an angular section by which said screw-section may be easily driven into the post, and a revolving and gravitating hook loosely pivoted in a vertically-adjustable support secured to the gate, all substantially as specified.

In testimony whereof I subscribe my name in the presence of two witnesses.

AVERY VAN WIE.

Witnesses:
 BENJAMIN BOOTH,
 ABE. L. TEETOR.